United States Patent [19]

Gautreaux et al.

[11] Patent Number: 4,883,687
[45] Date of Patent: *Nov. 28, 1989

[54] FLUID BED PROCESS FOR PRODUCING POLYSILICON

[75] Inventors: Marcelian F. Gautreaux; Robert H. Allen, both of Baton Rouge, La.

[73] Assignee: Ethyl Corporation, Richmond, Va.

[*] Notice: The portion of the term of this patent subsequent to Nov. 15, 2005 has been disclaimed.

[21] Appl. No.: 290,584

[22] Filed: Dec. 27, 1988

Related U.S. Application Data

[60] Division of Ser. No. 4,116, Jan. 16, 1987, Pat. No. 4,820,587, which is a continuation-in-part of Ser. No. 899,906, Aug. 25, 1986, abandoned.

[51] Int. Cl.$^4$ .................. B05D 7/00; C01B 33/02
[52] U.S. Cl. .................... 427/213; 423/348; 423/349
[58] Field of Search ............ 423/348, 349, 350; 427/213; 118/716

[56] References Cited

U.S. PATENT DOCUMENTS

| | | | |
|---|---|---|---|
| 4,154,870 | 5/1979 | Wakefield | 427/8 |
| 4,207,360 | 6/1980 | Padovani | 427/213 |
| 4,292,344 | 9/1981 | McHale | 427/45.1 |
| 4,314,525 | 2/1982 | Hsu et al. | 118/716 |
| 4,444,811 | 4/1984 | Hsu et al. | 427/213 |
| 4,661,335 | 4/1987 | Boudot et al. | 423/348 |
| 4,784,840 | 11/1988 | Gautreaux et al. | 423/349 |

OTHER PUBLICATIONS

Hsu et al, Fines in Fluidized Bed Silane Pyrolysis, J. Electrochem Soc., vol. 131, No. 3, pp. 660–663 (Mar. 1984).
Hsu et al, Fluidized Bed Silicon Deposition, 18th IEEE Photovoltaic Specialists Conference (1984), pp. 553–557.
Eversteijn, Gas-Phase Decomposition of Silane in a Horizontal Expitaxial Reactor, Philips Res. Reports 26, 134–144 (1971).

Primary Examiner—John Doll
Assistant Examiner—Lori S. Freeman
Attorney, Agent, or Firm—John F. Sieberth

[57] ABSTRACT

Silicon of high purity is made by decomposing silane in a fluidized bed reactor. To obtain good process economics, two modes of operation are used. In a first mode, the reactor is operated under high productivity conditions which also result in co-production of silicon dust or fines. The dust on the particles can cause problems in handling. For example, in bagging the particles, or removing the particles from a bag, the dust can become airborne from the larger particle surfaces and form an objectionable cloud of silicon dust. The invention provides a method for uniting dust to the larger silicon particles. In a second process mode, a thin (0.1–5.0 micron) layer of high purity silicon is deposited on the dust laden particles. This second mode is most preferably carried out by (a) treating the dust-laden particles with a deposition gas comprising 1 to 5 mole % silicon admixed with an inert carrier gas such as hydrogen, (b) in a fluidized bed reactor, and (c) at a process temperature of 620°–650° C. The product polysilicon is composed of free flowing, approximately spherical particles having a size distribution of 150–1500 microns, an average size of 650–750 microns and has a particle bulk density of 2.3 grams per cubic centimeter, a bulk density of about 1360 kg/m$^3$ and a silicon surface dust content of less than 0.08 wt. %.

2 Claims, 4 Drawing Sheets

*FIG. 3.*
*POLYSILICON*
*MAGNIFICATION 500X*

*FIG. 3A.*
*POLYSILICON*
*MAGNIFICATION 10,000 X*

FIG. 4.
SIEMENS PROCESS POLYSILICON
MAGNIFICATION 500 X

FIG. 4A.
SIEMENS PROCESS POLYSILICON
MAGNIFICATION 10,000 X

FLUID BED PROCESS FOR PRODUCING POLYSILICON

CROSS REFERENCE TO RELATED APPLICATION

This application is a division of application Ser. No. 4,116, filed Jan. 16, 1987, now U.S. Pat. No. 4,820,587, which in turn is a continuation-in-part of parent application Ser. No. 899,906 filed Aug. 25, 1986, now abandoned for Fluid Bed Process and Product (now abandoned).

BACKGROUND OF THE INVENTION

1. Field of the Invention

This invention pertains to silicon produced by silane pyrolysis in a fluidized bed reactor. More particularly, it pertains to an improved form of high purity silicon.

2. Description of the Prior Art

As a base material for semiconductor devices, silicon is more widely used than any other semiconductor. Silicon's dominant role results from its unique, favorable combination of semiconductor properties. Throughout the world, semiconductor grade silicon is produced by the Siemens process. In that process, slim rods of silicon are heated by electric current, and the heated rods are exposed in a suitable vessel to a gaseous mixture of hydrogen and trichlorosilane. Under the reaction conditions employed, silicon deposits on the rods, causing them to grow in size. In a modification of the Siemens process, silane is used as a gaseous source of silicon, rather than trichlorosilane.

Rods of polysilicon produced by the Siemens and modified Siemens processes described above, are not used directly. Instead, the rods are sawn or broken into chunks. The chunks are irregular in shape and about the size of a man's fist, or smaller. They are characterized by having irregular faces bounded by sharp, irregular surfaces. The chunks are not free flowing.

In order to make the solid state electronic devices used today, it is first necessary to transform polysilicon into monocrystalline silicon. Worldwide, about 80% of this basic material is produced by the Czochralski method; the rest mainly by the float zone method. In 1984, about 2500 metric tons of single crystal silicon was produced by the Czochralski process. This represents over 73 billion semiconductor devices.

In the Czochralski process, polysilicon is melted in a suitable crucible, a seed crystal is dipped into the melt, and then slowly withdrawn exactly vertically to the melt surface. Liquid silicon crystallizes on the seed. The result is an essentially single crystal rod with the angle between the cylindrical axis and the crystal orientation being close to zero.

The volume of the crucible employed cannot be totally filled by polysilicon chunks. Depending on the size of the chunks there is an unfilled crucible volume of about 30-50% between the chunks. To minimize the unfilled volume, chunks are piled above the top surface of the crucible, and to do this well, the chunks are stacked by hand. The operator visually selects the size and shape of the chunks in order to stack enough to charge the crucible with the proper weight of polysilicon. This process is laborious and time consuming. Furthermore, the operator's hands and gloves are frequently lacerated by the chunk edges.

In contrast to the chunks described above, the polysilicon of this invention is composed of free flowing, approximately spherical particles. They can be transported and handled readily. For example, they can be automatically charged to the melt crucible without being touched by the operator.

As more fully set forth below, the product of this invention is made by a fluidized bed process. At least one company makes polysilicon for its own internal requirements using a fluidized bed method in which trichlorosilane serves as the gaseous source of silicon. In contrast, the product of this invention is produced in a fluidized bed from silane. This reduces the opportunity or chances of chlorine contamination of the present product compared to the prior art material.

Use of silane in a fluidized bed reactor is not without problems. Silicon fines or dust is readily produced as a by-product. The dust is not only objectionable, but it represents an economical loss as well. Some aspects of dust formation are discussed in the art.

Eversteijn, *Philips Res. Repts.* 26, 134-144, (1971) comprises a study of gas phase decomposition of silane in a horizontal epitaxial reactor. It was found that gas phase decomposition is a serious factor that must be taken into account. In order to avoid gas phase decomposition, the maximum silane concentration in the hydrogen admitted to the reactor was 0.12-0.14 volume percent, depending on the gas temperature. When this critical silane concentration was exceeded, gas phase decomposition occurred giving rise to silicon fines which deposited on the substrate.

The Eversteijn article is referenced in Hsu et al, *J. Electrochem Soc.: Solid State Science and Technology,* Vol. 131, No. 3, pp. 660-663, (March, 1984). As stated there, the success of the Siemens process led to its universal adoption for producing semiconductor grade silicon, and the de-emphasis of fluidized bed process development. In 1975, the potential market for semiconductor-grade silicon for photovoltaic use made fluidized bed (FB) production of polysilicon more attractive. Fluidized bed operation has the capabilities of high-throughput, continuous operation and low energy cost. Because silane has a low deposition temperature, and can be completely converted in a non-reversible reaction, it is attractive for use in fluidized bed (FB) operation. Additional advantages are the non-corrosive atmosphere, and ease of recycling by-product hydrogen. In conventional chemical vapor decomposition devices, there is a limit of silane concentration in hydrogen beyond which unwanted fines are homogeneously nucleated. Thus, in addition to the desired decomposition, silicon dust or fines appear in the gas phase. These particles vary in size from submicron to $\sim 10$ microns, and present mechanical problems in the operation of the reactor. They are also difficult to transport. Dust and fines are considered losses in the process. Hence, conventional reactors are operated with low silane concentrations to prevent excess fines formation. In a fluidized bed reactor, less fines are generated because (i) there is less free space available for homogeneous nucleation and (ii) the silicon particles scavenge the fines and incorporate them into the deposition growth. Consequently, the net amount of fines is less than for chemical vapor deposition apparatus, and a fluidized bed reactor can be operated at much higher silane concentrations with greater throughput. Variables which effect the amount of fines elutriated were studied. Conclusions reached were as follows:

Elutriated fines increase with increased silane concentration, increased temperature, increased gas bubble size, and increased gas velocity. The authors selected 600°–800° C. and a gas velocity of $U/U_{mf}=3-8$ as good operating parameters.

Another article, Hsu et al, *Eighteenth IEEE Photovoltaic Specialists Conference* (1984) pp. 553–557, discusses additional studies on fines formation. It states that silane pyrolysis in a fluidized bed reactor can be described by a six-path process: heterogeneous deposition, homogeneous decomposition, coalescence, coagulation, scavenging, and heterogeneous growth on fines. The article indicates that fines formation can be reduced by providing at a suitable bed location, a secondary source of silane for cementation.

The cited art clearly shows that production of silicon via decomposition of silane is complicated, and that provision of improved processes is not straight forward. Nonetheless, because of continuing advances in the electronics industry and the development of new products in that field, improvements in existing technology are needed to provide high purity silicon at reduced cost. This improved product of this invention arises from a process which enhances operation of fluidized bed methods, by providing means to make high quality product under high productivity operating conditions. The product is very pure, and has little dust. Its physical form is such that it is highly attractive to the silicon industry. For these reasons it is fair to say that the product is highly revolutionary and an advance in the art.

SUMMARY OF THE INVENTION

This invention provides a polysilicon product characterized by being free flowing and in the form of approximately spherical particles having a size distribution of from 150–1500 microns, an average size of 650–750 microns, a particle density of about 2.3 grams per cubic centimeter and a bulk density of about 1360 kg/m³, said product being further characterized by having a silicon surface dust content of less than about 0.08 wt. %. This product comprises dust and larger particles bonded together. It is suitable for the production of monocrystalline silicon for semiconductor devices.

The products of this invention are free flowing and can be automatically handled with a monocrystalline silicon production facility.

In a preferred method, the products of this invention are made by a process comprising the step of intimately contacting:

(A) A bed of particles of high purity silicon maintained;

(i) in a vertically disposed reaction zone, and (ii) at a reaction temperature higher than the thermal decomposition temperature of silane with;

(B) Silane contained in a first and second decomposition gas, each of said deposition gases being introduced into said bed of particles at a flow rate sufficient to maintain said bed in a fluidized state within said reaction zone, said first deposition gas being introduced for a first deposition period and being a mixture of about 10 to about 15 mole percent silane in hydrogen, said second deposition gas being introduced for a second deposition period beginning substantially immediately after the termination of said first deposition period, and being a mixture of about 1 to 5 mole percent silane in hydrogen, said process being further characterized in that said first deposition period is from about 2 to about 5 times as long in time duration as said second deposition period.

This invention also comprises (I) conducting the process described immediately above and (II) subsequently recovering the larger-sized silicon particles that are formed in said reaction zone.

DESCRIPTION OF PREFERRED EMBODIMENTS

A preferred embodiment of this invention is polysilicon product characterized by being free flowing and in the form of approximately spherical particles having a size distribution of from 150–1500 microns, an aVerage size of 650–750 microns, a particle density of about 2.3 grams per cubic centimeter and a bulk density of about 1360 kg/m³, said product being further characterized by having a silicon surface dust content of less than about 0.08 wt. %.

Since the product is composed of small spheres, and is free flowing, it has superior handling characteristics compared to chunks made from Siemens polysilicon. Furthermore, as stated above, the free flowing characteristics obviate the laborious stacking of Siemens chunks into a crucible.

The products of this invention are made by a process comprising depositing on the surface layer of dusty silicon particles a thin layer of high purity silicon having an average thickness of from about 0.1 to about 5 microns to cement silicon dust to the surface of said high purity silicon particles, said layer being produced by the thermal decomposition of silane gas, said process being conducted:

(A) By fluidizing a bed of high purity silicon particles having removable silicon dust on surfaces thereof with a stream of deposition gas having a motive force sufficient to maintain said bed in a fluidized state, such that such silicon particles are intimately contacted with sufficient silane contained within said deposition gas to deposit said thin layer of silicon on said particles, said deposition gas consisting essentially of silane and an inert carrier gas admixed therewith, and containing from about one to about five mole percent silane;

(B) And at a reaction temperature between the thermal decomposition temperature of silane and the melting point of silicon.

Figure 1:
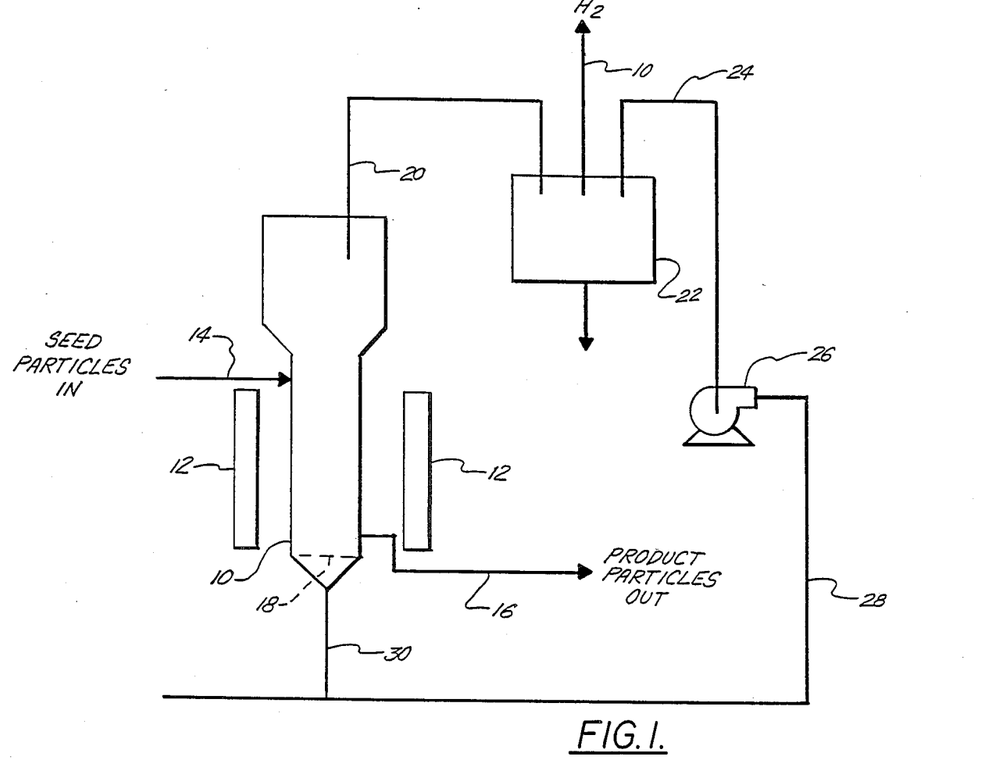
FIG. 1, is a schematic representation, partly in cross section and not to scale, of a fluid bed reactor and attendant equipment in accordance with certain embodiments of this invention. This figure pertains to a semicontinuous process or method of this invention.

As indicated above, the polysilicon product of this invention is made in a fluidized bed reactor. Reference to FIG. 1 will illustrate the preparative process.

The products of this invention have the commercially attractive combination of high quality and free flowing form. With this combination, the products offer crystal growers for the first time, a product that is tailor-made for the development of continuous melt replenishment systems.

The free flowing form of the products enhance their ability to be packaged in containers which facilitate handling in the crystal grower's plant. For example, the free flowing particulates of this invention are conveniently packaged in bags. The polysilicon can be poured from the bags into a crucible for melting while the crucible is in place in the puller device. Because the bulk density of the particulate product is approximately the same as Siemens material, similar charges can be made.

In addition to bags, larger samples of the free flowing polysilicon particulates can be shipped in appropriately coated drums which contain up to 250 kg of product. The following examples illustrate handling of the particulate product.

Example A

Small samples of approximately 10 kg of polysilicon product of this invention are packaged in a Teflon bag that is enclosed in two polyethylene bags which, in turn, are packaged in a cardboard box (one sample per box).

Before opening, the plastic bags should be removed from the box in order to avoid contamination with dust and box fibers. The sealed flap is cut and the outer polyethylene bag is removed. The second polyethylene bag is opened and the Teflon bag unfolded. The second polyethylene bag is not removed from the Teflon bag which is designed to prevent tearing of the relatively fragile Teflon bag.

When pouring the polysilicon into a quartz crucible for melting, the bag lip should be placed well down in the crucible.

Example B

Stainless steel drums with a non-contaminating coating are used for batches or samples of up to 250 kg of polysilicon product of this invention. The drums are thoroughly purged with inert gas prior to filling with the polysilicon product. The container should be opened in a clean area and the time of exposure minimized. The polysilicon can be removed with a quartz or silicon scoop or other non-contaminating device.

For small charges, the crucible can be filled to the desired level, covered and then placed inside the puller. With large charges, it may be necessary to partially fill the crucible, place it in the puller and then add the remainder of the charge in a noncontaminating manner.

A conical top which includes an integral flow control device can be used for multiple drum handling. The following procedures are recommended for emptying drums of polysilicon product of this invention using this device:

1. Vacuum the top of the drum and the conical top assembly to remove particles and dust.
2. Remove the drum cover and securely install the conical top on the drum.
3. Using a mechanical drum inverter, invert the drum assembly and place over a crucible loading station.

Note: A crucible loading station should consist of a small booth with shields or curtains and a HEPA filtered air system or other means of providing a clean environment for crucible loading.

4. Place crucible or other noncontaminating containers under the drum and open the flow control valve to regulate polysilicon loading.
5. Cover the loaded container and transport to the furnace.
6. Repeat this procedure until the drum is empty.
7. Invert the drum, remove the conical flow valve assembly and securely fasten the original cover to the drum.

Free flowing particulate polysilicon of this invention has been successfully melted in several different crystal growing systems over a range of charge sizes. These results demonstrate that polysilicon of this invention offers the semiconductor and solar industries an attractive alternative to material currently used in Czochralski type pullers.

Some melting procedures which hold the crucible high in the heating zones have resulted in occasional bridging of the surface pellets. This appears to be associated more with large charges where the surface of the charge is insufficiently heated. For smaller charges (20 kg or less) many conventional procedures work quite well with particulate polysilicon.

One method that has proven very successful in providing adequate heating to the surface of large charges involves the use of a heat reflector during the melting cycle. A thin flat disc or conical shaped molybdenum reflector is suspended from the seed lift mechanism about 3–5 inches above the surface of the charge. The charge is then melted using a conventional melting procedure; starting with the crucible high and lowering in increments after a given time or event. After the charge has melted and is being stabilized, the reflector is isolated in the pull chamber, removed from the seed lift mechanism and replaced with the seed. Specific procedures utilizing heat reflectors that have worked quite well for different charge sizes and pullers follow.

Example C

Melting Polysilicon of this Invention

Puller: Hamco 3000, Analog controls
Crucible: 14" diameter
Charge: 28 kg polysilicon of this invention
Heat Reflector: 6½" diameter, conical shape (30° cone)

Install the molybdenum reflector on the seed lift mechanism and lower to 3 inches above the surface of the charge. (Use maximum diameter that can be removed through isolation valve.)

Start with the crucible high (+2.0") and rotating at 1 RPM.

Control the heat input by maintaining a constant temperature in the hot zone about 100° C. lower than that used for rod polysilicon. (Thermocouple or pyrometer in hot pack insulation).

After 80 minutes lower the crucible to −2.25 inches (jog down) and lower the reflector to 2 inches above the heater.

After an additional 40 minutes raise the crucible to −2.0 inches.

When the charge slips into the melt, raise the temperature by about 100° C. to the temperature used for melting rod polysilicon and finish the meltdown.

When the entire charge is molten and clean, reduce the temperature and/or heat input to that normally used for stabilization.

While the melt is stabilizing, isolate the reflector in the pull chamber. (Be careful that reflector does not catch on the throat opening.)

Remove the reflector, install the seed and evacuate the pull chamber.

When the pressures have equilibrated, open the isolation valve and prepare for seed dip.

The remainder of the cycle should be the same as used for conventional material.

Example D

Melting Polysilicon of this Invention

Puller: Hamco 6000, Analog controls
Crucible: 14" diameter
Charge: 28 kg polysilicon of this invention
Heat Reflector: 9½" flat dual disc separated by ½" air space Install the molybdenum reflector on the seed lift mechanism and lower to 5 inches above the surface of the charge. (Use maximum diameter that can be removed through the isolation valve.)

Start with the crucible +0.5 inches above the heater and rotating at 1 RPM.

Control the heat input at that used for rod polysilicon during the entire melting cycle (approximately 110 kw. for this machine).

After 30 minutes, lower the crucible to −0.5 inches. (Do not move reflector.)

After an additional 30 minutes, lower the crucible to −1.5 inches. (Do not move reflector.)

When the entire charge is molten and clean, reduce heat rate to that normally used for stabilization.

Stabilize melt for about an hour.

While the melt is stabilizing, isolate the reflector in the pull chamber. (Be careful not to catch on the throat opening.)

Remove the reflector, install the seed and evacuate the pull chamber.

When the pressures have equilibrated, open the isolation valve and prepare for seed dip.

The remainder of the cycle should be the same as used for conventional material.

With regard to melting parameters for large charges, experience to date teaches that the melt should begin with the crucible high to initially heat the bottom of the charge as is done with conventional polysilicon. The crucible should then be lowered to 2 to 3 inches below the top of the heater for some time period during the first half of the melting cycle to heat the surface and prevent severe bridging. When the charge slips into the melt, the crucible can be adjusted to a conventional level for the remainder of the melt. It has been found that holding the crucible low in the hot zone for long periods or using high heat rates during the first half of the melt cycle can cause excessive oxide formations, which sometimes results in loss of structure during crystal growth. The heat balance without a reflector appears to be more delicate, and different combinations of crucible elevation changes and heat rate adjustments will likely be required for different pulling systems and charge sizes to optimize performance.

Other parameters such as crucible rotation, inert gas purge rate, system vacuum, etc. for melting polysilicon of this invention should be similar to those used for conventional material. The initiation of crystal growth and the remainder of the growing process should be the same as used with conventional polysilicon.

In FIG. 1, a fluidized bed reactor is illustrated by reactor 10 having a reaction zone containing particles of high purity silicon. The reactor is fitted with external heating means 12 surrounding the reactor zone, and sufficient to heat the bed of particles to an operation temperature above the decomposition temperature of silane. The reactor is fitted with feedline 14 for introduction of seed silicon particles, and line 16 for removal of larger-sized silicon particles formed by the process of the invention. The reactor has a gas distributor 18 which is a multiple pore device through which silane and hydrogen, or other carrier gas, is introduced into the bed of particles in the reactor. The pores of the distributor device are numerous, to facilitate intimate contact of the deposition gases with the particles in the reaction zone. Line 20 provides for exit of gases, (such as carrier gas, unreacted silane, and by-product hydrogen) admixed with silicon fines or dust particles formed during the process. The fines are removed by collection device 22. Hydrogen from the collection device can be recycled through line 24, pump 26 and a heat exchanger, not shown, back into the reactor as carrier gas. The process is a net producer of hydrogen and therefore a portion of hydrogen from device 22 can be sent via line 28 to other uses, not part of this invention.

The hydrogen and silane are admixed and adjusted to desired concentrations by passage through metering and monitoring devices (not shown). After admixture, the resultant gas mixture enters the reactor device below distributor 18 via line 30. The incoming gas may be preheated if desired. To prevent fouling and plugging, distributor 18 may be fitted with cooling means, (not shown).

Preferably, the reactor is first operated under high productivity conditions, for example by using a deposition gas containing 10 to 100 mole percent silane and a process temperature of preferably 620°–750° C. When operated in this manner, a significant amount of silicon metal dust or fines is formed as a co-product. Some of this is removed by line 20 and collected in collection device 22, as described above. Other dust particles are deposited on the surface of the larger silicon particles in the fluidized bed, and can cause problems on handling after the larger particles are removed from the device.

To avoid these problems, the operation of the device is shifted to a mode of operation which adheres the dust particles or fines and the larger silicon particles in the bed. This mode comprises reducing the amount of silicon dust in the product by fluidizing the particulate product including silicon dust with a gaseous stream comprising a vaporous silicon-containing compound and maintaining the temperature to favor chemical vapor deposition of silicon so that a thin layer of metallic silicon is formed on the particulate product and silicon dust is adhered thereto. Thus the preparative method of this invention involves two depositions of silane.

Thus in the process employed, a significant amount of the surface dust deposited on the particle surfaces during the high productivity operation will have become glued on, bonded or united, i.e. made to adhere to the larger particles by the thin layer deposited from the second deposition gas. The dust or fines are typically composed of particles about 0.2–0.5 microns in size; the particles on which the silicon deposition take place preferably have a surface mean diameter of about 400–1000 microns, more preferably about 400 to about 700 microns. Generally, during the second deposition, homogeneous decomposition of silane cannot be entirely avoided and consequently some additional dust is deposited upon silicon particles in the bed. However, since the second deposition is conducted under conditions which heavily favor heterogeneous deposition, the amount of additional dust deposited is relatively small. However, some dust may remain on the particles after the cementing operation and may be produced by that operation.

The use of two deposition gases in the invention as discussed above reflects two important aspects of this invention. First, it is desirable, from the standpoint of productivity, to operate a fluidized bed reactor for production of silicon from silane under conditions by which silicon is deposited rapidly, but which (unfortunately) also cause homogeneous decomposition of silane to occur to a significant extent, thereby resulting in formation of a significant amount of silicon fines or dust coproduct. Although the fines or dust elutriated from the reactor are not nearly as valuable as the larger silicon particles produced, and in fact can amount to waste, operation in such a regime is attractive because growth of the silicon particles occurs at a rate faster than achievable under conditions where only chemical vapor deposition takes place. To upgrade the product particles, it is desirable to lower the amount of dust that is loosely deposited on the surface. Of course, the dust can be removed by polishing or by immersing the dusty particles in a liquid and agitating the resultant mass, say with ultrasonic vibration to assist removal of the dust. But an alternative method is needed since such treatments are costly, wasteful and can introduce a source of particle contamination. This invention satisfies that need.

The second important aspect comprises the discovery that the use of the second deposition gas as taught herein comprises a treatment that cements surface dust, resulting in a product that not only has the required purity, but which can be more readily handled. It was also unexpectedly discovered that this bonding or uniting of the surface particles requires less than one micron, for example 0.1–1.0 microns. Hence, for this invention 0.1 to 5.0 microns of additional silicon are deposited on the particle surface.

Figure 2:
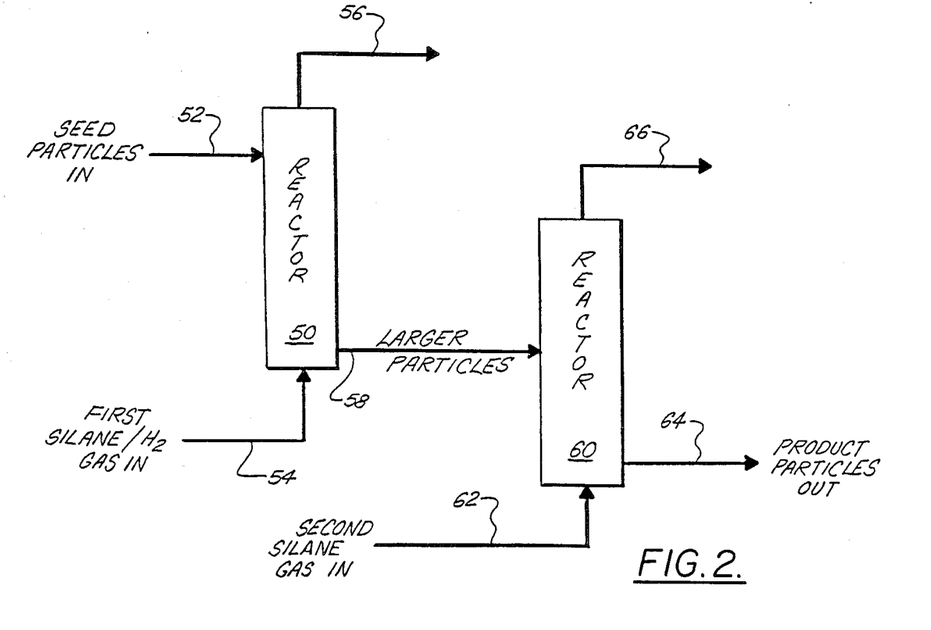
FIG. 2 is a schematic flow diagram, not to scale, depicting a more continuous operation of this invention. In contrast to the method and apparatus of FIG. 1, which comprise usage of one fluidized bed reactor, the embodiments depicted by FIG. 2 employ two such reactors; the product of the first reactor being fed to the other reactor so that the first reactor can be operated in a continuous or nearly continuous manner.
Figure 3:
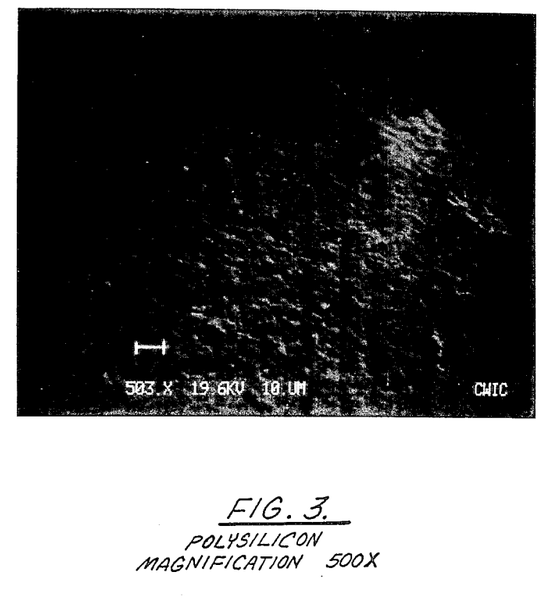
FIGS. 3, 3A, 4, and 4A are photomicrographs showing differences in surface characteristics of prior art polycrystalline prepared by the Siemens process and the process of this invention.
Figure 3A:
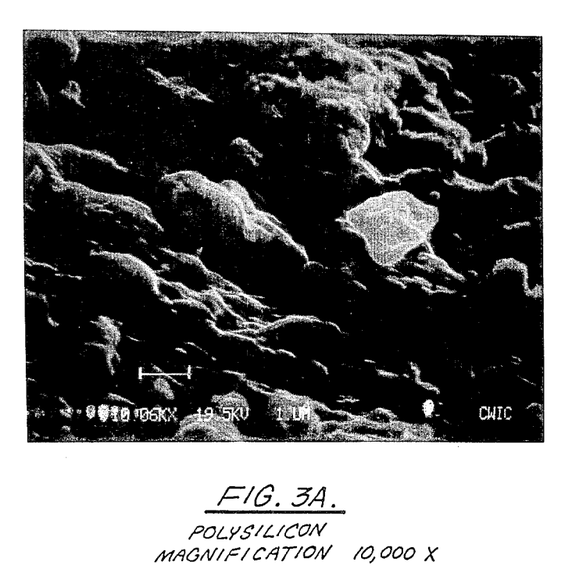
Figure 4:
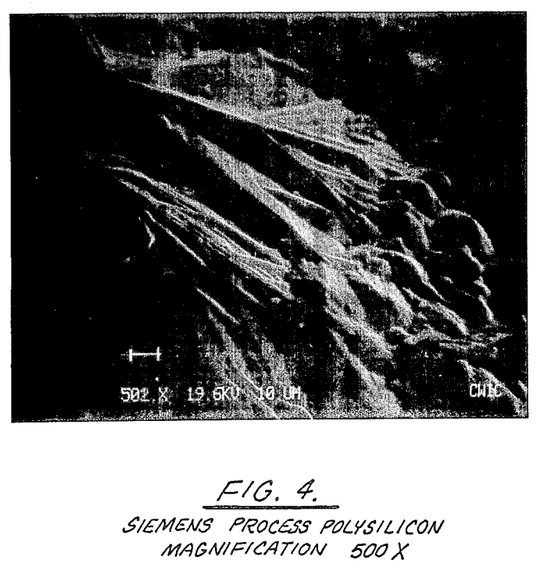
Figure 4A:
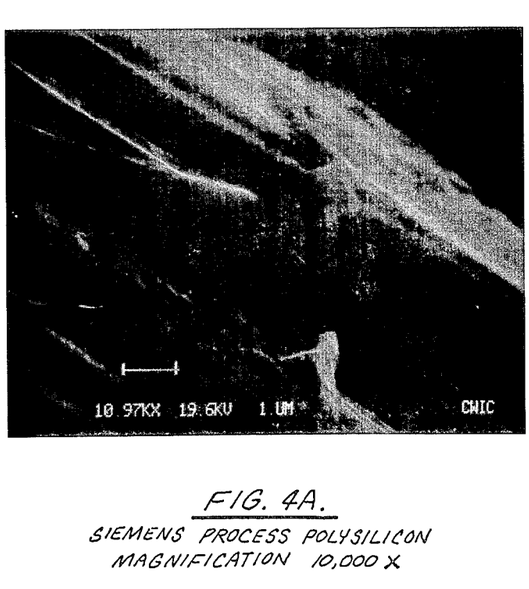
Figure 5:
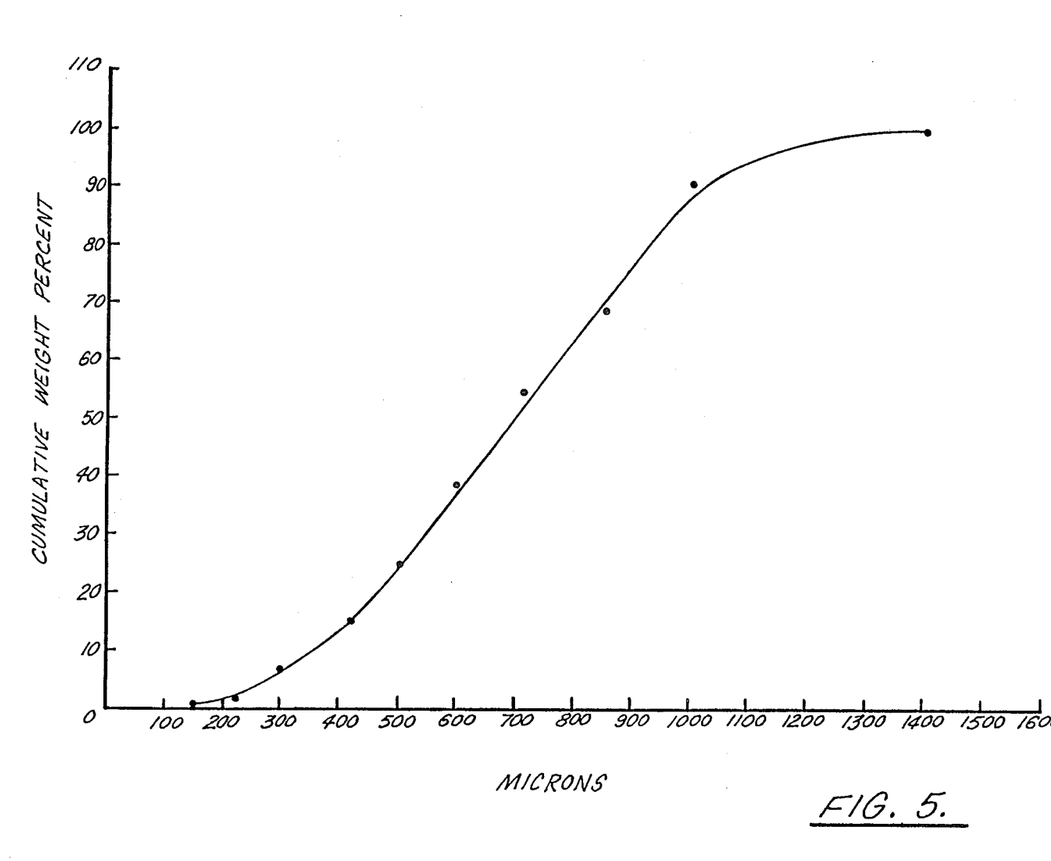
FIG. 5 is a particle size distribution cure of a typical product of this invention.

In FIG. 2, reactor 50 is a fluidized bed reactor substantially as described above and as depicted in FIG. 1. The reactor is charged with a bed of silicon seed particles from line 52 near the top of the reactor, as shown. Under the selected reaction conditions, the bed is fluidized and the particles therein contacted with the first deposition gas. It is preferred that this first gas be a mixture of $SiH_4$ and $H_2$ (designated by "FIRST SILANE/$H_2$ GAS" in the drawing). This gas is introduced into the reactor via line 54. In the reactor, deposition of silicon and decomposition of silane occurs, resulting in growth of the silicon particles, deposition of silicon fines on the surface of said particles, and elutriation of additional fines with carrier gas and by-product hydrogen through exit line 56 at the top of the reactor. After the particle growth, a portion of the bed of particles is taken off by line 58 near the bottom of the reactor. This is replaced in the first reactor with additional seed particles and the first deposition in that reactor continued.

Line 58 is connected to fluidized bed reactor 60 such that particles with surface silicon dust are transferred from reactor 50 to reactor 60. In reactor 60 the second deposition gas, i.e. designated "SECOND SILANE/$H_2$ GAS" in the drawing is introduced through line 62. After cementing dust on the particle surfaces, product particles are removed through line 64. Gas and any elutriated fines exit the reactor through line 66. Hydrogen produced in either or both reactors can be recycled to either or both reactors after admixture with silane, or sent on for other usage.

In this embodiment the second reactor can be smaller than the first because only a minor portion of the total silane is contacted with the particles in the second reactor. It can also be operated at a different temperature.

Although from a theoretical point of view it might be better to operate such that all silane contacted with the bed of silicon particles decomposes to form silicon while being contacted with the bed, this is generally not the preferred case in actual practice. It has been found advantageous to operate the first step, i.e. the high productivity mode under conditions wherein about 10–25% of the silane does not react and exits the reactor. Operation in a regime that comprises this feature enhances productivity; growth or deposition rates are higher at higher conversions, however dust production is high when conversions are high. For the second mode dust formation is much reduced.

Generally, there is a threshold or minimum gas velocity required to keep the particle bed in a fluidized state. Operational velocities for input of deposition gas into the bed are generally somewhat above this minimum, $U_{min}$. In many instances the operation velocity U, is 1 to 10 times $U_{min}$; preferred velocities are $1.2 < U/U_{min} < 8$; more preferably, $1.5 < U/U_{min} < 3.5$.

In the process of this invention, the first and second deposition gas may be introduced at the same or different rates, as desired. Generally, good results are obtained if the hydrogen or other inert gas is introduced at about the same rate, and differing rates are used for silane in order to adjust the concentration of silane. As indicated above, the first deposition gas is preferably used so that silane is introduced at a rate which together with the other variables favors high productivity, while the second gas is introduced with silane under conditions which heavily favor chemical vapor deposition and reduce the amount of homogeneous decomposition. In many instances the slower introduction of silane in the second step or mode results in a higher percent of silicon introduced (as silane) being deposited.

For this invention, the introduction of gases into the fluidized bed is conducted by introducing the gases at a slightly positive pressure to facilitate fluid flow. The pressure of the gas introduced at or near the interface of the distributor and the bed is generally 1 to 3 atmospheres, more preferably from about 1.01 to 2 atmospheres.

Intimate contacting of the gaseous reactant and deposition surface is facilitated by introducing gas into the bed through a distributor having a plurality of openings in its surface adjacent to the bed of particles. Preferably the openings are substantially uniform, relatively small, and substantially evenly spaced across the surface that is adjacent to the bed surface.

As immediately recognizable by a skilled practitioner, it is necessary that the process be conducted above the decomposition temperature of silane; i.e. above about 500° C. Thus, suitable means must be provided so that the deposition gas being contacted with the silicon particles is above the temperature at which silane thermal decomposition begins to take place. The process temperature is further selected so that the relative rates of (a) deposition of silicon on the particle surfaces compared to the (b) rate of fines formation via homogeneous gas phase decomposition is within acceptable limits. Thus, it is preferred that the process temperature be within the range of from about 590° C. to about 650° C.; more preferably from about 620° C. to about 650° C. The temperature can be any temperature between the thermal decomposition temperature of silane and the melting point of silicon. The preferred temperatures given above are selected for use with silane and by such considerations as the level of impurities picked up from feed lines in the reactor employed, and the degree of homogeneous decomposition. Utilizing a different system or a different degree of homogeneous decomposition, the process can be operated very well with different preferred temperatures. Usually the temperature for the first and second mode are about the same since it is inconvenient to change the temperature because of the high heat capacity of the apparatus; especially when it is comparatively large in size.

To facilitate maintaining the desired temperature in the reaction zone, the gases used for silicon deposition and/or to maintain the particle bed in ebullient motion can be preheated prior to introduction into the reactor. For example, the hydrogen can be preheated. Preheating can be to some temperature level below that which causes silicon deposition within the distributor. To help avoid this difficulty, the distributor can be fitted with cooling means. Moreover, the gas should not be heated so high as to cause an untoward amount of deposition near the distributor which welds or solders so many beads together that an untoward amount of pluggage occurs. It has been found that good results are obtained if the gas is preheated to a temperature of about 300°–400° C.

The process of this invention is conducted using a fluidized bed of silicon particles. These particles are of sufficient purity to be acceptable for the use intended. The seed particles used to prepare particles in the bed can be prepared by this invention followed by reducing particle size to an average of 200 microns with an 80–400 microns range. Seed particles can be irregular in shape. They tend to become substantially spherical during operation of the reactor. Preferably the bed particles after silicon deposition have a $d_{ps}$ of 400–1000 microns, more preferably from about 600 to about 800 microns. However, beds having a $d_{ps}$ of 300–2000 microns can be used. The average particle size and the size range is not critical, so long as the bed can be fluidized under acceptable operating conditions.

The process of this invention can be operated in the high productivity mode for as long as desired. In other words, for the high productivity operation, time is essentially an independent variable and is only governed by convenience, reactor capacity, amount of silane available or some similar operation variable or variables. As an example, when using an 18" reactor, at a productivity rate of 50 pounds of silicon per hour, a reaction temperature of 650° C., a deposition gas comprising 12–14% silane in hydrogen, a bed of particles weighing about 350 kg and having an average particle diameter of 450 microns (mu), it is convenient to cease high productivity operation when the bed weight has increased by about 40 kg to a total of about 390 kg.

After about that increase in weight, operation is shifted to the quality mode to unite dust particles deposited on the surface of the particles in the fluidized bed and thereby prepare the product of the invention. Typically, the quality mode for an 18" diameter reactor comprises contacting the bed of silicon particles with deposition gas of 1–5, preferably 2–4 mole percent silane in hydrogen, for the time required to deposit an additional layer of about 0.1 to about 5 microns in thickness. This causes a significant part of the dust on the particles to glue on to the particles and form the improved product.

After the second layer is deposited, product is discharged from the reactor. Generally one removes about the weight of (a) new seed particles introduced plus (b) the weight of silicon deposited during the productivity and gluing on cycle.

To achieve preferred results, the use of the second deposition gas is conducted for a relatively short time but sufficient to cause a diminishment of the amount of readily removable dust on the surface of the silicon particles. Generally it is preferred to keep the duration of the quality-mode relatively short, so that operation can relatively quickly return to the high productivity mode and thereby allow the process to be conducted at a high overall productivity rate.

The general desirability to keep usage of the second deposition gas to a short duration has two ramifications. First, it is generally preferred to select as thin a second coat as will effectively do the job. As shown in one example given below, after about the first micron in thickness, additional deposition did not have an appreciable effect in reducing dust. Second, since the amount of silane to be utilized in the second deposition is a quantity that can be fairly closely estimated by calculation, and since the concentration of silane in the second deposition gas must be comparatively low so as to operate in a region where chemical vapor deposition is highly favored, the time duration when the second gas is employed is a dependent rather than an independent variable.

Generally, good results are obtained when the elapsed total time, which is the sum of the time durations of the first and second deposition periods, is within the range of about 2.5 to about 5 hours. Also, good results are obtained when the first deposition is from about 2 to about 5 times, as long in duration as the second deposition. It is preferred to use a process sequence where the first deposition period is from about 2½ to about 3½ hours in duration and the second is from about ½ to about 1¼ hours in operation.

Preferably, the second deposition gas flow is begun before 10 minutes or so has elapsed from the termination of treatment with the first gas, i.e. the second gas is contacted with the silicon particles substantially immediately after the first gas has been contacted.

It is not necessary that the process be terminated after the second step is conducted. The sequence of the first and second deposition can be repeated after removal of product from the reactor and the addition of seed particles. For example, with product removal and replenishing of seed particles as indicated above, the process can be run one or two weeks or more, i.e. indefinitely, by repetition of the deposition sequence 100 or more times.

To conduct the process of this invention, the operator charges the reactor with the desired amount of silicon bed particles. The reactor volume filled with particles is measured. After using a first deposition gas, the mass of silicon that has been deposited within the particle bed is determined. For example, the operator may charge the reactor with 300 kg of bed particles having an average particle size or surface mean diameter ($d_{ps}$) of 625 microns. After bringing the bed to an operating temperature of say 640° C., a first deposition gas, for example comprising 65 standard cubic feet per minute of hydrogen and 50 pounds per hour of silane, is introduced into the reactor and this gas mixture is continuously fed for three hours. From reactor effluent gas analysis for unreacted silane, and from the amount of dust collected in the effluent gas during the feeding period, the operator can determine what percentage of silane fed has deposited silicon on the bed particles. For example, assume the operation results in 90% of the silicon that was fed as silane being deposited on the bed particles. Then:

Si deposited =

$$50 \text{ lbs/hr} \times \frac{28 \text{ (at wt of Si)}}{32 \text{ (mol wt of SiH}_4)} \times 90\% = 39.4 \text{ lbs/hr}$$

This is equal to (39.4÷2.2) or 17.9 kg/hr of silicon deposited. Therefore, the increase of bed weight over 3 hours is (17.9×3) or 53.7 kg. The increase in bed weight can be expressed as (54.7/300) or 18%.

From a sample of the bed particles, the operator determines the particle size distribution using a screen analysis. From this determination the operator calculates surface area per gram or surface mean diameter, $d_{ps}$. For example, assume screen analysis shows that the $d_{ps}$ after the three hour deposition has increased from 625 to 650 microns. Then, the total bed particle surface area is given by the expression:

$$Ap = \frac{6W_p}{d_{ps} \cdot \rho}$$

where $\rho$ is the density of silicon, i.e. 2.32 gm/cm$^3$. Hence, Ap in this instance will be:

$$\frac{6 \times 354 \text{ kg} \times 1000 \text{ g/kg}}{650 \times 10^{-4} \text{ cm} \times 2.32 \text{ g/cm}^3}$$

$$\frac{2.124 \times 10^6}{1508 \times 10^{-4} \text{ cm}^{-2}}$$

$$\frac{2.124 \times 10^6}{0.1508 \text{ Cm}^2} = 14.08 \times 10^6 \text{ cm}^2$$

Assume further that the operator wishes to deposit a layer of silicon of average thickness ($\Delta$) or ($\Delta x$) of 1.5 micron to make the dust on the surface of the particles adhere to and become a part of the particles. Then, the amount of silicon to be deposited is given by the relationship:

$$\text{Si required} = \Delta x Ap \cdot \rho$$
$$= 1.5 \times 10^{-4} \text{ cm} \times 14.085 \times 10^6 \text{ cm}^2 \times \frac{2.32 \text{ kg}}{1000 \text{ cm}^3}$$
$$= \frac{49.0 \times 10^2 \text{ kgcm}^3}{1000 \text{ cm}^3}$$
$$= 4.9 \text{ kg of silicon}$$

If the operator assumes a 95% deposition efficiency for the silicon fed as silane, then the total amount of silane to be fed in the second deposition gas will be $$\text{Silane required} = \frac{4.9}{0.95} \times \frac{32}{28} = 5.9 \text{ kg silane}$$

If the silane is to be provided in a concentration of 4 mole percent with hydrogen introduced at 65 SCFM, then the following calculations show the rate of introduction of silane.

$$\text{wt H}_2/\text{hr} = 65 \text{ ft}^3/\text{min} \times 0.028 \text{ m}^3/\text{ft}^3 \times 1000/\text{m}^3 \times$$
$$0.09 \text{ g/l} \times 60 \text{ min.}$$
$$= 9828 \text{ g or } 9.8 \text{ kg of H}_2 \text{ per hour}$$

This amount of hydrogen is equal to 9828/2 or 4914 moles of hydrogen per hour. At a desired concentration of 4 mole percent in the second deposition gas, (0.04×4914) 0.96 or 204 moles of silane must be fed per hour, i.e. or 6.55 kg of silane. Since only 5.9 kg of silane is required for depositing the 1.5 micron layer, the operator will feed the silane at the calculated rate for 0.9 hours, i.e. 54 minutes.

The total depositions are 53.7+4.9 or 58.6 kg of silicon. Hence the operator can withdraw 58.6 kg of product from the reactor, calculate the number of product particles and replenish the reactor with the same number of seed particles and repeat the cycle.

Table I gives surface dust measurements of typical fluid bed operation. The data were obtained from three different size reactors configured as shown in FIG. 1 and operated as described above. Particle size, silane concentrations, and bed temperature were varied as indicated in the table. These data show a direct relationship between the reactor productivity and the amount of dust adhering to the particle surface. To produce polysilicon with an acceptable surface dust level (e.g., 0.1 wt. %) with a reactor operated using typical prior art fluid bed operating procedures, reactor productivity would be limited to 10–20 lbs/hr ft$^2$. However, because of obvious economic considerations, it is desirable to operate at higher productivities and, much higher productivities are usable. Examples of higher productivities are given in the table. Thus dust produced by the high productivity mode exemplified by Table I can be reduced in amount following the procedures of the gluing on mode described herein and illustrated by the examples.

TABLE I

| | | | PRODUCT SURFACE DUST FOR TYPICAL FLUID BED OPERATION | | | |
|---|---|---|---|---|---|---|
| | | Average | Silane Feed | | Average | Bed | |
| | Reactor | Bed Temp. | Productivity[1] | Molar % | Particle Size | Mass, | Surface |
| Reactor | I.D., Inch | °C. | Lb/Hr Ft$^2$ | In H$_2$, | (dps)[2], micron | kg | Dust, Wt % |
| 1 | 4.5 | 650. | 11. | 7.5 | | | .08 |

TABLE I-continued

| Reactor | Reactor I.D., Inch | Average Bed Temp. °C. | Silane Feed | | Average Particle Size (dps)[2], micron | Bed Mass, kg | Surface Dust, Wt % |
|---|---|---|---|---|---|---|---|
| | | | Productivity[1] Lb/Hr Ft[2] | Molar % In H$_2$ | | | |
| 2 | 6.25 | 650. | 33.8 | 12. | 777. | 52. | .22 |
| | 6.25 | 650. | 36.1 | 12. | 714. | 50. | .33 |
| | 6.25 | 650. | 44.6 | 14. | 748. | 31. | .34 |
| | 6.25 | 650. | 33.3 | 14. | 660. | 50. | .34 |
| | 6.25 | 650. | 33.3 | 14. | 690. | 50. | .36 |
| | 6.25 | 650. | 46.9 | 18.5 | 724. | 45. | .48 |
| 3 | 14.5 | 660. | 19.-25. | 5.7-7.5 | 845. | 370. | .092-.123 |
| | 14.5 | 645. | 44. | 15.4 | 545. | 370. | .31 |
| | 14.5 | 627. | 44. | 15.4 | 328. | 230. | .197 |
| | 14.5 | 624. | 44. | 12.1 | 851. | 220. | .358 |
| | 14.5 | 624. | 44. | 13.0 | 671. | 280. | .284 |
| | 14.5 | 632. | 65. | 19.1 | 627. | 230. | .221 |

[1]Productivity defined as the silane feed rate per reactor cross sectional area.
[2]Surface mean diameter, microns.

EXAMPLE 1

A 400 kg bed of silicon particles was charged to the 14.5 inch diameter reactor and operated for 80–90 hours in a semicontinuous mode whereby seed particles were added every 1–2 hours and product was removed every 1–2 hours. By this procedure, bed level was maintained essentially constant during this period. The bed was subjected to deposition conditions as follows:

| | |
|---|---|
| Average bed temperature | 645° C. |
| Silane feed rate | 25 lbs/hr |
| Hydrogen feed rate | 23–33 scfm |
| Silane feed concentration | 11.5–15% molar |
| U/U$_{min}$ | 2.2–3.2 |
| Silicon Deposition | 19 lbs/hr |

At the end of the period a sample was taken for screen and surface dust analyses. The surface mean particle diameter, d$_{ps}$, was determined to be 460 micron and particle surface dust was 0.198 wt. percent.

To analyze for surface dust, a 10 gram sample of silicon particles was placed in 10 ml of methanol in a screw capped bottle (approx. 4 oz. capacity) and placed in a water bath of an ultrasonic shaker device and subjected to ultrasonic vibrations (nominally 55,000 vibrations per second) for 30 minutes. The methanol with silicon dust particles suspended therein was passed through a sieve of 125 mu mesh. The procedure Was repeated until the methanol remained clear after sonification. The methanol/silicon dust portions were combined and evaporated to dryness. The weight of the dried dust removed was determined. As indicated above, after the first deposition the weight of the dust was 0.198 wt. percent of the sample.

To glue surface dust on to the larger particles the bed was subjected to second deposition conditions as follows:

| | |
|---|---|
| Average bed temperature | 645° C. |
| Period | 0.5 hours |
| Silane feed rate | 4 lbs/hr |
| Hydrogen feed rate | 31 scfm |
| Silane concentration | 2.5% molar |
| Silicon deposition rate | 2.8 lbs/hr |

A sample of the particles was analyzed as above and the result was 0.12 wt. % surface dust. The silicon deposited was sufficient to add a layer of about 0.1 micron thick to the bed particles.

The procedure of this example can be repeated with the first deposition period using a silane feed stock containing 20%, 40%, 60%, 80%, or 90% silane admixed with hydrogen. Pure silane can also be employed. The temperature employed can be from 590° C. to 750° C. The gases used to glue on the surface dust can contain 1–5 mole percent silane in hydrogen. The deposition gases in both stages of operation, i.e. the first or high productivity stage, and the second mode, i.e. the gluing on process, can be preheated to 300°–400° C. prior to introduction into the bed of particles. The particle bed can be maintained in a fluidized state by introducing the gases at a rate defined by U/U$_{min}$ of from 1.5 to 3.5. The deposition in the second mode can be conducted to deposit a layer of silicon of 0.1 to 5 microns in thickness. In those instances where the gases contain hydrogen admixed with silane, the hydrogen utilized can comprise hydrogen recovered from the reactor and recycled to the input gases.

In the process of the above example, the first deposition can be conducted by adding seed particles every 1.0 to 3.5 hours. The second deposition or gluing on step can be conducted over a period of ¼ to 1¼ hours in duration.

In the process of the above example, the deposition gases comprising silane and hydrogen, or substantially pure silane, can be introduced at a pressure of slightly above atmospheric pressure, i.e. about 1.01 atmospheres to about 3 atmospheres.

In the process of the above example the gluing on step is preferably conducted at 620°–650° C. using a gas containing 1–5, more preferably 2–4 mole percent silane in hydrogen.

The process of the above example can be repeated using silicon particles having a d$_{ps}$ of 400–1000 microns and with dust particles of from sub-micron size, e.g. 0.2–0.5 microns up to about 10 microns. The process of the above example can be repeated using seed particles of 200 microns d$_{ps}$ with a d$_{ps}$ range of 80–400 microns.

EXAMPLE 2

Following the operation of Example 1, product was drawn from the reactor so that 370 kg of particles remained in the bed. The deposition of silicon was resumed and conducted for 24 hours using the following conditions:

| | |
|---|---|
| Average bed temperature | 645° C. |
| Silane feed rate | 50 lbs/hr |
| Hydrogen feed rate | 55 scfm |
| Bed level reduced to | 370 kg |

A sample of the bed was removed to determine particle size distribution and surface dust:

| | |
|---|---|
| $d_{ps}$ | 545 microns |
| Surface dust | 0.31 wt. % |

The operation was resumed using a silane feed rate of 11.6 lbs/hr, and a silane concentration of 4% in hydrogen with a silicon deposition rate of 8.1 lbs/hr. The effect of surface dust was determined over time intervals of 1, 2, and 3 hours of treatment with the second deposition gas. The results were as follows:

| Hours of Treatment with Second Deposition Gas | Surface Dust Wt. % | Cementation Layer Added, Microns |
|---|---|---|
| 0 | 0.31 | — |
| 1 | 0.072 | 0.91 |
| 2 | 0.063 | 1.81 |
| 3 | 0.073 | 2.72 |

The dimensions of the cementation layers were calculated from the 8.1 lbs/hr silicon deposition rate, the 370 kg bed and the 545 micron $d_{ps}$. The discrepancy in surface dust weight percent for the two hour run is believed to be due to experimental error.

EXAMPLE 3

Table II below summarizes results and conditions of several typical long duration fluid bed operations during which the semicontinuous method of this invention was demonstrated.

Typically, a bed of silicon particles of desired particle size distribution taken from previous operation is charged to the 14.5 inch diameter reactor. After desired bed temperature is reached, first deposition gas is fed for three hours. For each of the runs given in Table II, first deposition gas consisted of 50 lbs/hr silane mixed with 70 scfm of hydrogen (12.3% silane). During this period, bed increases from about 270 to about 315 kg of silicon.

At the end of the first deposition period, adjustments to silane and hydrogen feed rates are made to give the desired second deposition gas composition. Silane feed rate is reduced to 14.1 lbs/hr and hydrogen rate increased to 78.3 scfm (3.4% silane) The second deposition gas feed is continued for 1 hour which deposits about 4.5 to 5 kg of silicon essentially uniformly over the entire bed particle surface. This operation is intended to deposit from 1.5 to 2.0 microns of surface layer depending on the exact particle size distribution.

During the last 10 minutes of the second deposition period, product is withdrawn from the reactor to bring bed back to the level at the start of the cycle. The amount withdrawn each cycle is estimated by the operator to be the sum of the weight of seed particles added plus the calculated amounts of first and second silicon depositions. Once product is withdrawn, silane and hydrogen flows are reset to the first deposition conditions.

Seed particles are added to the reactor at the start of each cycle to maximize growth on seed particles. Over the duration of the run, product particle size is controlled by the operator by the number of seed particles added each cycle. No attempt is made to change temperature from first to second deposition period because of the slow response time of this high heat capacity system. However, as feed gases are changed, bed temperature does increase slowly about 5° C. during the second deposition period and return slowly during the first. Table II gives the average temperature over the entire cycle.

TABLE II

| Run No. | Hours of Operation | No. of Cycles[2] | Bed Weight, kg | Avg. Bed Temp.,°C. | Product Size $(dps)$[1], microns | Surface Dust, Wt % | | | | Layer Thickness Microns |
|---|---|---|---|---|---|---|---|---|---|---|
| | | | | | | No. Samples | Range | Mean | Std. Dev. | |
| 1 | 172 | 43 | 270 | 650 | 662 | 13 | .031–.127 | .079 | .027 | 1.6 |
| 2 | 168 | 42 | 271 | 668 | 708 | 10 | .012–.072 | .052 | .017 | 1.7 |
| 3 | 68 | 17 | 247 | 656 | 698 | 3 | .046–.06 | .052 | .007 | 1.9 |
| 4 | 151 | 38 | 260 | 628 | 727 | 10 | .022–.066 | .042 | .0151 | 1.8 |
| 5 | 147 | 37 | 262 | 632 | 671 | 11 | .015–.044 | .030 | .0083 | 1.7 |
| 6 | 170 | 43 | 265 | 640 | 744 | 14 | .016–.061 | .039 | .0151 | 1.9 |
| | 867 | | | | | 61 | | .049 | | |

[1] dps is the surface mean diameter.
[2] The cycle was fixed at:
1. 3 hrs at 50 lb/hr silane feed, 69.5 SCFM H$_2$, then
2. 1 hrs "gluing on" at 14.1 lb/hr silane, 78.3 SCFM H$_2$ - product removed last 10 minutes.

Table II shows that surface dust was reduced to the range 0.03–0.08 wt. percent practicing this invention. For the same productivity and temperature range, dust would otherwise be between 0.3 and 0.35 wt. percent, Table I. Second deposition layer thickness ranged from 1.6 to 1.9 microns during the six runs for bed weights in the 247 to 271 kg range and surface mean particle sizes of 662 to 744 microns. These runs comprise a total operating time of 876 hours and 61 samples taken for surface dust analyses.

The process of the above example can be modified and repeated so that the cycle used is a first deposition period of 2.5–3.5 hours and the second deposition period "gluing on" is 0.67–1.25 hours.

It will be apparent to a skilled practitioner that the procedure of the above examples can be modified to a more continuous basis using two FB reactors. For example, the first step or high productivity mode is conducted in the first reactor, say by using a 400 kg bed of silicon particles, a bed temperature of 645° C., a silane feed rate of 25 lbs/hr, a seed addition rate of 1 lb/hr, a hydrogen feed rate of 27.5 cfm, a silane feed concentration of 15% molar, and a U/U$_{min}$ of 2.2–3.2 and a silicon deposition rate of 19 lbs/hr.

Each hour, a 20 lb (19+1) charge of particles can be transferred from the first to the second reactor and surface dust glued on using a deposition temperature of 645° C. The bed size is selected so that the residence time is sufficient to yield the desired thickness of cementation layer. The feed rate of hydrogen selected is sufficient to fluidize the bed, the silane concentration is 1–5% to produce low dust operation.

The process of this invention produces a highly desirable polysilicon product useful for the production of silicon semiconductor devices. The product in the form of approximately spherical particles. These are free flowing, and therefore can be handled much more readily by mechanized systems than the rods formed by the Siemens process. Mechanical systems can be designed for storage, and handling of the free flowing material produced by this invention which decrease the chances for contamination. In general the size distribution of products produced by this invention have the following size distribution (microns):

|  |  |
|---|---|
| Typical range | 150–1500 |
| Typical average | 650–750 |

The particle density (g/cc) is:

|  |  |
|---|---|
| Typical range | 2.25–2.33 |
| Typical average | 2.30–2.31 |

Preferred materials have a bulk density of about 1360 kg/m$^3$. Surface dust is typically 0.010–0.070 weight percent. Using silane of good purity the concentration of key transition metal impurities approaches or matches high quality available Siemens product. Typical purities from operation are:

|  |  | Average | Range |
|---|---|---|---|
| Boron | ppba | 0.12 | 0.01–0.25 |
| Phosphorus | ppba | 0.11 | 0.01–0.19 |
| Carbon | ppm | 0.25 | 0.16–0.33 |

While the invention has been described in terms of various preferred embodiments, those skilled in the art will recognize that various changes, modifications or omissions, can be made without departing from the heart or spirit of the invention as described above and set forth in the claims which follow below.

We claim:
1. A process comprising the step of intimately contacting:
   (a) a bed of particles of silicon maintained:
      (i) in a vertically disposed reaction zone, and
      (ii) at a reaction temperature higher than the thermal decomposition temperature of silane with;
   (b) silane contained in a first and second decomposition gas, each of said deposition gases being introduced into said bed of particles at a flow rate sufficient to maintain said bed in a fluidized state within said reaction zone, said first deposition gas being introduced for a first deposition period and being a mixture of about 10 to about 15 mole percent silane in hydrogen, said second deposition gas being introduced for a second deposition period beginning substantially immediately after the termination of said first deposition period, and being a mixture of about 1 to 5 mole percent silane in hydrogen, said process being further characterized in that said first deposition period is from about 2 to about 5 times as long in time duration as said second deposition period, such that polysilicon in the form of approximately spherical particles is produced, said particles having
      (i) a size distribution of from 400 to 100 microns;
      (ii) an average size of 650 to 750 microns;
      (iii) a boron content of no more than 0.25 ppba;
      (iv) a phosphorus content of no more than 0.19 ppba;
      (v) a carbon content of no more than 0.33 ppm; and
      (vi) a surface dust content less than about 0.08 weight percent bonded to said particles by a silicon layer in the range of 0.1 to about 5 microns in thickness.
2. A process of claim 1 further characterized by producing said approximately spherical particles such that said silicon layer is 0.1 to 1.0 micron in thickness.

* * * * *

UNITED STATES PATENT AND TRADEMARK OFFICE
CERTIFICATE OF CORRECTION

PATENT NO. : 4,883,687

DATED : November 28, 1989

INVENTOR(S) : Marcelian F. Gautreaux et al

It is certified that error appears in the above-identified patent and that said Letters Patent is hereby corrected as shown below:

Title page:

The last line of the Abstract reads "less than 0.08 wt. %" and should read -- less than about 0.08 wt. % --.

Column 20, line 30, reads "from 400 to 100" and should read -- from 400 to 1000 --.

Signed and Sealed this

Thirtieth Day of April, 1991

Attest:

HARRY F. MANBECK, JR.

*Attesting Officer*

*Commissioner of Patents and Trademarks*